Sept. 11, 1951 E. B. BÖTTGER 2,567,869

REEL FOR WINDING TELEPHONE CORDS

Filed Aug. 31, 1949

Inventor:
Erik Björn Böttger

By: Edward F. Jurow
Atty.

Patented Sept. 11, 1951

2,567,869

UNITED STATES PATENT OFFICE 2,567,869

REEL FOR WINDING TELEPHONE CORDS

Erik Björn Böttger, Fredrikstad, Norway

Application August 31, 1949, Serial No. 113,374
In Norway October 29, 1948

2 Claims. (Cl. 242—77)

It has previously been suggested to provide a spring actuated reel for the telephone cord that extends between a telephone receiver and a telephone housing, the arrangement having been such that the reel always tends to wind up the telephone cord, so that the latter is in wound up condition on the reel adjacent to the telephone housing when the telephone receiver is not in use.

Such reels are subject to rather strict demands. For instance, the reel should be small and as light in weight as possible, and it should not wear the telephone cord noticeably when the latter is wound on or unwound from the reel. Nor should it appreciably shorten the total available cord length.

The present invention relates to a reel of said type in which the different problems are solved in a surprisingly simple manner.

One object of the invention is the provision of a novel fastening arrangement which permits attachment of the telephone cord to the reel. According to the invention the winding reel comprises a cylinder having flanges secured to the ends thereof, and having a pair of spaced apart longitudinally extending parallel edges and a pair of spaced apart circumferentially extending parallel edges defining a peripheral space, a tongue attached to one of said longitudinal edges and circumferentially extending into spaced proximity with the other longitudinal edge, a tab longitudinally extending from a side of said tongue, in the plane of such tongue, into spaced proximity with one of said circumferential edges, a pair of bails each secured at their median portions to the opposite ends of the cylinder at the outer side of the flanges and extending transversely of the axis of the cylinder beyond the periphery of the flanges, the respective adjacent ends of such bails mounting pairs of rollers, each of such pairs of rollers which are of a length shorter than the cylinder length being disposed with their axes parallel to the cylinder axis and being transversely aligned with one of the peripheral spaces which are formed between a side of the tongue and the adjacent circumferential edge of the cylinder.

Figure 1:
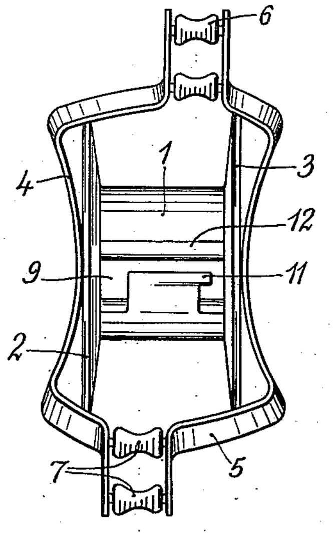
Figure 2:
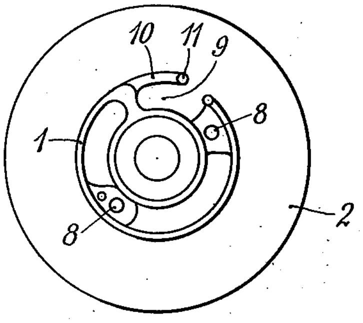
Figure 3:
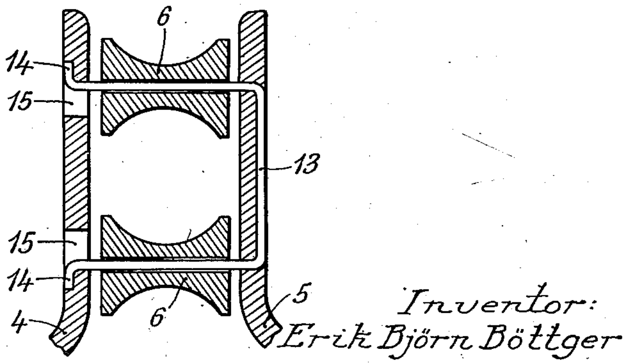

The invention will be more fully explained in connection with the drawing, in which Figure 1 is a top view of the reel, Figure 2 is an end view of the cord winding cylinder, as seen from the right end of Figure 1, the detachable end flange being removed and Figure 3 is a sectional view along a plane passing through the axes of a pair of rollers.

A cylinder 1 is provided with a fixed end flange 2 and with a detachable end flange 3. The latter may be secured to the cylinder 1 by means of a pair of screws entering threaded holes 8 (Fig. 2) in the cylinder. Two bails 4 and 5 are pivotally connected to the flanges by means of central studs (not shown). At the respective ends of such bails and extending therebetween are two pairs of rollers 6 and 7 which serve to guide the telephone cord during winding and unwinding.

In the periphery of the cylinder 1 there is a space or cut-out 9 that extends for the full cylinder length between the end flanges 2 and 3. Centrally of such space a tongue 10 extends, the top side of which substantially coincides with the cylinder surface. A tab 11 projects from the side of such tongue to extend longitudinally of the cylinder toward the adjacent flange 3. The distance between one side of said tongue 10 and the end flange 2 is such that a telephone cord may freely be inserted through the space into the cut-out portion 9. Moreover, the side or edge 12 of the cut-out is removed a sufficient distance from the end of the tongue 10 so that the telephone cord may readily pass therethrough. But the distance between the tab and the end flange 3 is narrow, so that the telephone cord cannot pass between tab 11 and flange 3 when the detachable flange 3 has been fastened to the cylinder 1 by screws. For insertion of the telephone cord through the space between the tab 11 and flange 3 the securing screws of the flange 3 are loosened so that the flange 3 may be moved away from the end of the cylinder 1 to increase the space between the tab and the flange 3 and permit passage of the cord through said space. Then the flange 3 is brought into position again to hold the cord between itself and the tab 11.

That part of the cord which comes up over the tab 11 is guided between the rollers 6, whereas that part of the cord which comes up from beneath tongue 10 through the cut-out portion nearest to the flange 2 is guided by the rollers 7. Guiding in this manner, winds the cord evenly, and the cord is not severely worn by winding and unwinding. Due to the fact that the cord is disposed downwardly into the cylinder both space and material are saved.

A spring device which can be used with this reel has one end thereof attached to the central stud of the bail 5, is wound around said stud, and the other end thereof is attached to the flange 3 or to the cylinder 1.

In the arrangement shown the pairs of rollers through which the end portions of the cord are guided are situated at opposite ends of the cord winding cylinder. This arrangement ensures that the cord will be wound up evenly and that the cord will not be unduly worn during winding.

In order that the end portions of the cord may be introduced between the pairs of rollers 6 and 7, the rollers must, however, be releasable from one of said side bails. The present invention also comprises a very simple arrangement whereby this may be effected, as shown in Figure 3. Although Figure 3 illustrates the arrangement with reference to the pairs of rollers 6, the rollers 7 are similarly arranged.

The pair of rollers is mounted between projecting portions of the bails 4, 5, each roller being rotatable on a leg of a U-shaped member 13 which extends through both bails. The ends of the legs of the U-shaped member are turned over at right angles to each leg and are passed through openings in bail 4 and are retained due to the resilience of the member 13. The openings 15 are of such dimensions that by pressing the legs of member 13 towards each other and thereafter displacing the bails 4, 5 somewhat from each other, the ends 14 will be disengaged from the bail 4, so that the telephone cord may be introduced between the rollers 6. As shown on the drawing the ends 14 of the member 13 are suitable countersunk in grooves in the bail 4 and similarly the bottom part of the U-shaped member may be wholly or partially countersunk into the other bail 5.

I claim:

1. A winding reel comprising a cylinder having flanges secured to the ends thereof, and having a pair of spaced apart longitudinally extending parallel edges and a pair of spaced apart circumferentially extending parallel edges defining a peripheral space, a tongue attached to one of said longitudinal edges and circumferentially extending into spaced proximity with the other longitudinal edge, a tab longitudinally extending from a side of said tongue, in the plane of such tongue, into spaced proximity with one of said circumferential edges, a pair of bails each secured at their median portions to the opposite ends of the cylinder at the outer side of the flanges and extending transversely of the axis of the cylinder beyond the periphery of the flanges, the respective adjacent ends of such bails mounting pairs of rollers, each of such pairs of rollers which are of a length shorter than the cylinder length being disposed with their axes parallel to the cylinder axis and being transversely aligned with one of the peripheral spaces which are formed between a side of the tongue and the adjacent circumferential edge of the cylinder.

2. A winding reel according to claim 1 wherein the pairs of rollers are removably supported at the adjacent ends of said bails by resilient U-shaped members.

ERIK BJÖRN BÖTTGER.

REFERENCES CITED

The following references are of record in the file of this patent:

UNITED STATES PATENTS

| Number | Name | Date |
|---|---|---|
| 1,136,305 | Andrews | Apr. 20, 1915 |
| 1,153,829 | Rueckert | Sept. 14, 1915 |
| 2,232,461 | Kuckhoff | Feb. 18, 1941 |
| 2,406,435 | Payne | Aug. 27, 1946 |

FOREIGN PATENTS

| Number | Country | Date |
|---|---|---|
| 454,557 | Great Britain | Sept. 28, 1936 |